ns Patent [19]

Nikolayczik

[11] 4,327,771
[45] May 4, 1982

[54] SANITARY WATER VALVE

[75] Inventor: Hans Nikolayczik, Minheim, Fed. Rep. of Germany

[73] Assignee: American Standard Inc., New York, N.Y.

[21] Appl. No.: 146,535

[22] Filed: May 2, 1980

[30] Foreign Application Priority Data

May 8, 1979 [DE] Fed. Rep. of Germany ....... 2918430

[51] Int. Cl.³ .................... F16K 11/06; F16K 47/02
[52] U.S. Cl. ................................. 137/625.4; 251/127
[58] Field of Search ............................ 251/127, 118; 137/625.4, 550

[56] References Cited

U.S. PATENT DOCUMENTS

| 2,922,616 | 1/1960 | Budde | 137/550 X |
| 3,515,305 | 6/1970 | Weber et al. | 137/550 X |
| 3,664,369 | 5/1972 | Johnson | 137/550 X |
| 3,763,879 | 10/1973 | Jawdrek | 137/550 X |
| 3,920,043 | 11/1975 | Fowell | 251/118 X |
| 4,157,099 | 6/1979 | Delker et al. | 137/625.17 |

Primary Examiner—Arnold Rosenthal
Attorney, Agent, or Firm—James J. Salerno, Jr.; Robert G. Crooks; John P. Sinnott

[57] ABSTRACT

A sanitary water valve of the disc valve type is provided with a noise damping assembly which is arranged in the recess of a disc is disclosed. The noise damping assembly is preferably in the form of a screen, is arranged and constructed to be self-retaining or self-clipping and requires no latching members for mounting the noise damping assembly with the recess of the disc.

4 Claims, 7 Drawing Figures

SANITARY WATER VALVE

BACKGROUND OF THE INVENTION

In U.S. Pat. No. 3,920,043 and U.S. Pat. No. 3,893,483 there is provided a noise-damping sieve assembly arranged at a specific distance from the bottom of the surface duct or recess. The sieve, in one embodiment, is held between two annular portions abutting the side walls of the surface duct, one annular portion of which is used as a range spacer for determining the distance between the sieve and the bottom of the surface duct, while the other annular portion is used to secure the sieve. Besides the actual sieve, two annular portions are also required for the positioning and securing of the sieve in the surface duct.

Sieves are also known formed from one piece and shaped like a kind of basket, wherein the open end of the sieve basket is supported on the bottom of the surface duct, see U.S. Pat. No. 4,157,099. Thus the side wall of the sieve basket is also used to maintain spacing. The securing of the sieve, however, is effected via a separate annular portion.

Embodiments are also known with which a flat sieve is held in the surface duct between an annular portion of this type and a rotating shoulder.

It has been seen that the use of separate annular portions is relatively costly, is more difficult to maintain specific manufacturing tolerances with control discs made of ceramic material.

SUMMARY OF THE INVENTION

The invention generally contemplates providing a sanitary water valve consisting of a valve body with control elements formed from at least two discs, the first disc which is fixedly disposed and is provided with an outlet aperture, and inlet apertures which on the one side are attached to the water supply pipes and on the other side are directed against the second disc which is movably arranged on the first disc and has a surface duct for deflecting functions, in which there is at least one sieve, and which can be brought to overlap simultaneously, the inlet apertures and the outlet aperture.

The object of the invention is to reduce the cost by a simpler construction and arrangement of the one or more than one sieve and to remove the above-mentioned assembly problems.

Another object of this invention is achieved by the sieve being arranged in a self-retaining way in the surface duct and may be advantageously made of a plastic or metal mesh.

A further object of the invention is to provide a sieve assembly which is arranged and constructed to be pressed into the surface duct and which is self-retaining.

DESCRIPTION OF THE DRAWINGS

In the drawing the several objects of the invention are shown in two illustrative embodiments in which.

DESCRIPTION OF THE PREFERRED EMBODIMENT

Figure 1:
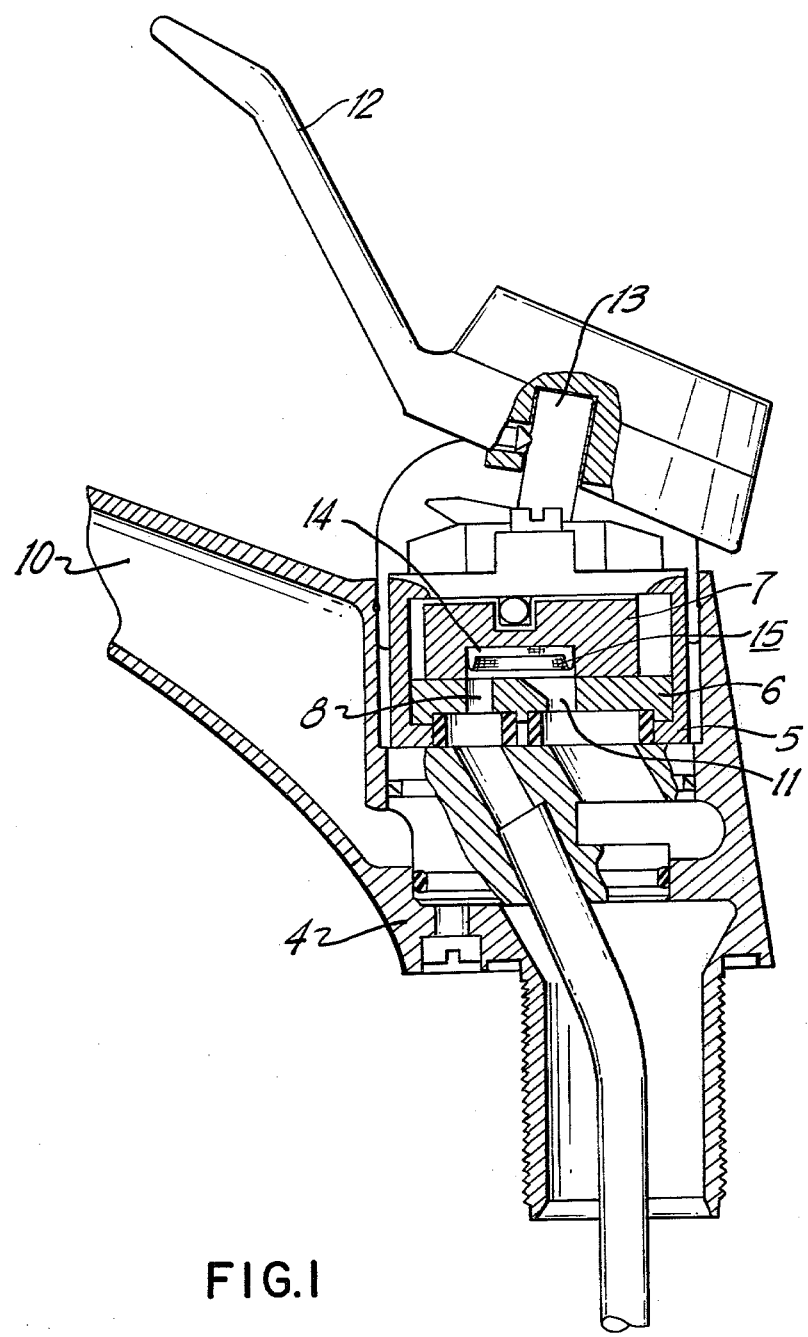
FIG. 1 is a sanitary water valve in the form of a mixing valve unit in longitudinal section and in the open position.
Figure 2:
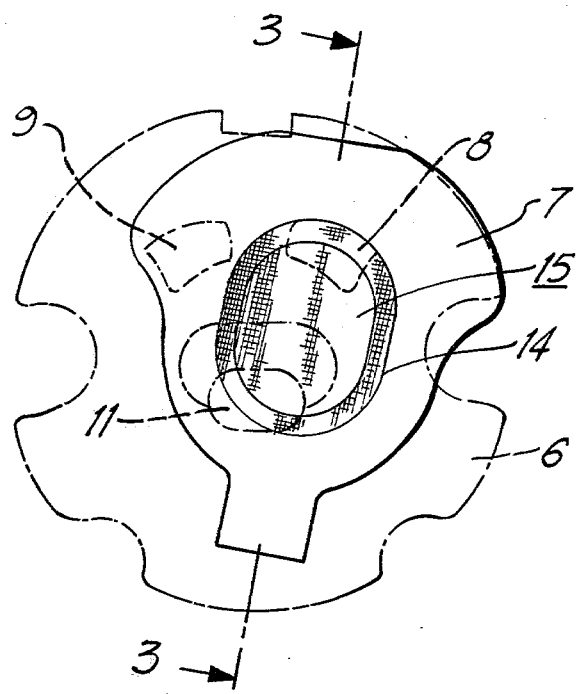
FIG. 2 is a plan view from underneath the upper disc provided with the surface duct, with a dot-dash line representation of the lower disc in the open position for cold water.

In the drawings the valve body of a sanitary water valve is designated by 4 and this valve holds a cartridge-like housing 5 with control elements formed from two discs 6 and 7. The disc 6 is fixedly disposed. It has two inlet apertures 8, 9 for cold and warm water as well as an outlet aperture 11 for the mixed water leading to an outlet 10. The disc 7 is arranged to be displaceable and swievllable on the disc 6 by a control lever 13 connected to the handle 12 and has a surface duct 14 for mixing and deflecting functions which can be brought to overlap by varying segments of the inlet apertures 8, 9 and the outlet aperture 11.

As can be seen, a sieve 15 is arranged in the surface duct 14. The sieve 15 is made of a resilient mesh material, e.g. metal, plastic, rubber or the like. The Sieve 15 is self-retaining and disposed in the surface duct 14.

According to FIGS. 1 to 6, sieve 15 is formed from one piece and in the shape of a kind of basket. In the non-mounted state the sieve 15 has a conical outer annular portion 16 as well as a conical inner annular portion 17, which on the one side passes into the sieve bottom 19 and on the other side forms, with the outer annular portion 16, a clamping rim 18 whose diameter is greater than that of the surface duct 14.

Figure 3:
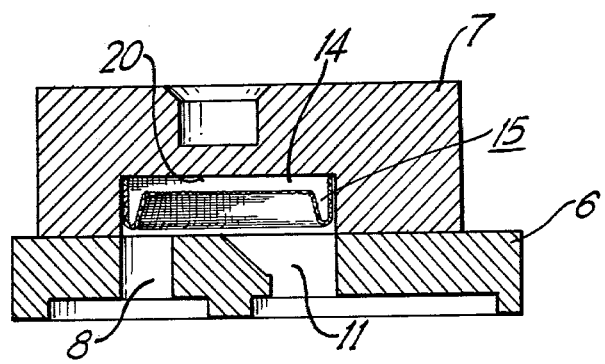
FIG. 3 is a longitudinal seciton along line 3—3 of FIG. 2.
Figure 6:
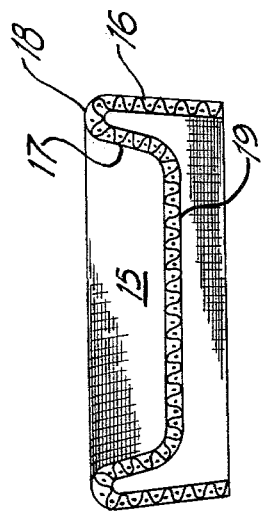
FIG. 6 is the sieve in section along line 6—6 of FIG. 4.

The sieve is pressed into the surface duct for example by means of a ram-punch abutting against the clamping rim 18 a predetermined depth so that the sieve assembly is spaced from the mating surfaces of the discs as illustrated in FIG. 3. Hence the clamping rim is positioned under pressure at the walls of the surface duct 14. The smaller the distance between the clamping rim 18 and the sealing surfaces of the discs 6, 7, the greater the noise damping. The sieve 15, however, can also be pressed by means of a spherical plastic or hard rubber roller into the surface duct 14.

In operation, the streams of water coming through the inlet apertures 8 and 9 of the lower disc 6 are conveyed on their way to the deflecting zone against the sieve 15 and are completely or partially finely dispersed. In this way a uniform flow of mixed water is deflected which results in a distinct reduction in noise formation.

Figure 7:
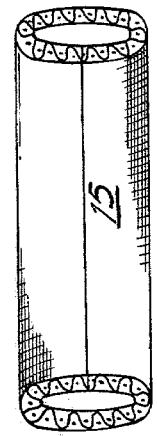
FIG. 7 is a sieve of a second embodiment in section.
Figure 5:
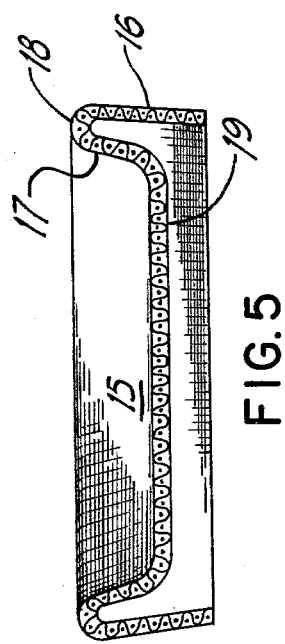
FIG. 5 is the sieve in section along line 5—5 of FIG. 4.
Figure 4:
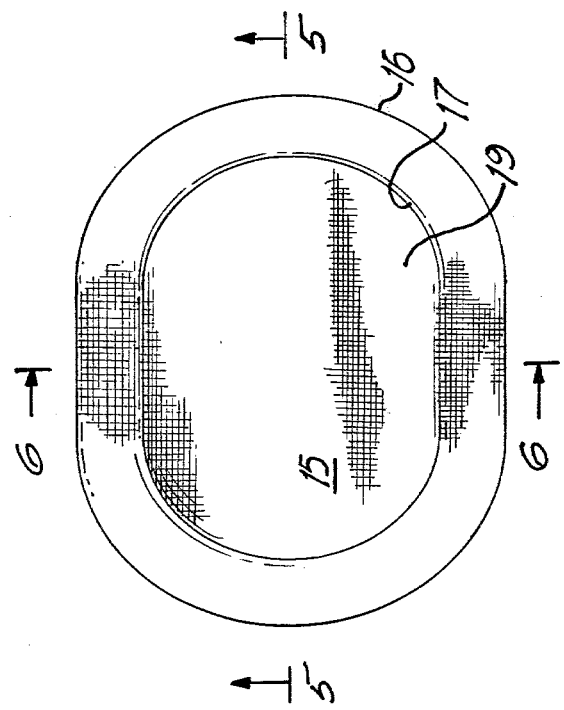
FIG. 4 is a self-retaining sieve in plan view.

Within the scope of the basis idea of the invention there are other possibilities with regard especially to the special arrangement and shape of the sieve. According to the second embodiment of FIG. 7, the sleve 15 could also be constructed as a hollow ring. In addition, sieves according to the invention could also be fitted in water valves which are provided with more than two disc-shaped control elements.

What is claimed is:

1. In a sanitary water valve including a valve body with control elements formed from at least two discs, the first of which discs is fixedly disposed and is provided with the inlet apertures which are attached on the one side to the water supply pipes and on the other side are directed against the second disc, which is movably arranged on the first disc and has a surface duct for deflecting functions which can be brought to overlap simultaneously in the inlet apertures and an outlet aperture also in the first disc, and in which there is one or more than one sieve, characterized in that said one or more than one sieve whose lineal dimensions are greater than the corresponding lineal dimensions of said surface duct so as to provide a compressive fit in said surface duct and whose height dimension is less than the depth of said surface duct and said sieve being in the form of a unitary piece of resilient material and shaped like a kind of basket, which in the non-mounted state has a conical outer annular portion and a conical inner annular portion which passes on the one side into the sieve bottom and on the other side forms, with the outer annualar portion, a clamping rim whose diameter is greater than that of the surface duct to provide a compressive fit when mounted therein.

2. The sanitary water valve according to claim 1, wherein the sieve is made of mesh material.

3. The sanitary water valve according to claim 1, wherein the sieve is made of plastic.

4. The sanitary water valve according to claim 1, wherein the sieve is made of metal.

* * * * *